(12) United States Patent
Hickey et al.

(10) Patent No.: US 12,304,326 B2
(45) Date of Patent: May 20, 2025

(54) METHOD AND SYSTEM FOR AN ELECTRIFIED VEHICLE

(71) Applicant: GM GLOBAL TECHNOLOGY OPERATIONS LLC, Detroit, MI (US)

(72) Inventors: Ryan P. Hickey, Austin, TX (US); Galen E. Ressler, White Lake, MI (US)

(73) Assignee: GM Global Technology Operations LLC, Detroit, MI (US)

(*) Notice: Subject to any disclaimer, the term of this patent is extended or adjusted under 35 U.S.C. 154(b) by 260 days.

(21) Appl. No.: 18/085,644

(22) Filed: Dec. 21, 2022

(65) Prior Publication Data

US 2024/0198803 A1 Jun. 20, 2024

(51) Int. Cl.
*B60L 3/04* (2006.01)
*B60L 3/00* (2019.01)
*B60L 58/12* (2019.01)
*B60W 10/26* (2006.01)

(52) U.S. Cl.
CPC ............... *B60L 3/04* (2013.01); *B60L 3/0046* (2013.01); *B60L 58/12* (2019.02); *B60W 10/26* (2013.01)

(58) Field of Classification Search
CPC ........... B60L 3/0007; B60L 3/04; H02H 5/10; H02H 7/18; H02M 1/322
See application file for complete search history.

(56) References Cited

U.S. PATENT DOCUMENTS

2011/0127945 A1* 6/2011 Yoneda ............... H01M 10/48
320/135
2012/0063044 A1* 3/2012 Fukuyama ............ B60L 3/0046
361/62
2013/0106362 A1* 5/2013 Mackintosh ........ H01M 10/482
320/136

(Continued)

FOREIGN PATENT DOCUMENTS

JP 07254437 A * 10/1995
JP 2017093187 A * 5/2017

OTHER PUBLICATIONS

ZVEI, "Voltage Classes for Electric Mobility", Dec. 2013, ZVEI, 44 pages, downloaded from: https://www.zvei.org/fileadmin/user_upload/Presse_und_Medien/Publikationen/2014/april/Voltage_Classes_for_Electric_Mobility/Voltage_Classes_for_Electric_Mobility.pdf(Year: 2013).*

(Continued)

*Primary Examiner* — David A Testardi
(74) *Attorney, Agent, or Firm* — Quinn IP Law

(57) ABSTRACT

A system for an electrified vehicle includes a rechargeable energy storage device (RESS) electrically couplable via an electric power bus to a high-voltage actuator, a telematics system, and an on-vehicle controller. The on-vehicle controller includes an instruction set that is executable to: receive, via the telematics system, a notification of a proximal impending catastrophic event; determine an intent to safeguard the electrified vehicle; execute a high-voltage discharge protocol in response to the intent to safeguard the (Continued)

electrified vehicle, wherein the high-voltage discharge protocol includes operating the high-voltage actuator; monitor a state of charge (SOC) of the RESS; and electrically decouple the RESS from the electric power bus when the SOC of the RESS is less than a first threshold SOC.

20 Claims, 2 Drawing Sheets

(56) References Cited

U.S. PATENT DOCUMENTS

| | | | |
|---|---|---|---|
| 2013/0285581 A1* | 10/2013 | Meyer, III | H01M 10/44 318/139 |
| 2013/0307480 A1* | 11/2013 | Boggs | B60L 58/10 320/118 |
| 2013/0337308 A1* | 12/2013 | Rathmacher | B60L 58/24 429/100 |
| 2014/0011058 A1* | 1/2014 | Adachi | B60L 50/66 429/61 |
| 2014/0049103 A1* | 2/2014 | Fink | B60L 3/0046 320/128 |
| 2014/0070772 A1* | 3/2014 | Andres | H02J 7/0016 320/136 |
| 2014/0117942 A1* | 5/2014 | Fisher | H02J 7/007182 320/135 |
| 2014/0132219 A1* | 5/2014 | Namou | B60L 53/14 320/127 |
| 2015/0051771 A1* | 2/2015 | Greenwood | B60L 58/12 701/22 |
| 2015/0061572 A1* | 3/2015 | Ju | H02J 7/007182 320/136 |
| 2015/0108951 A1* | 4/2015 | Yamaguchi | H02J 7/0048 320/136 |
| 2015/0151648 A1* | 6/2015 | Przybylski | B60W 50/14 701/2 |
| 2015/0224881 A1* | 8/2015 | Deyda | B60L 3/0069 701/29.2 |
| 2015/0352957 A1* | 12/2015 | Kuwano | B60L 3/0069 320/128 |
| 2015/0357681 A1* | 12/2015 | Kwon | H01M 10/44 429/61 |
| 2018/0093574 A1* | 4/2018 | Mifsud | B60L 3/0023 |
| 2018/0111482 A1* | 4/2018 | Saito | H01M 10/63 |
| 2019/0283626 A1* | 9/2019 | Staudenmaier | H01M 50/579 |
| 2019/0304207 A1* | 10/2019 | Light-Holets | G07C 5/008 |
| 2022/0234453 A1* | 7/2022 | Ito | B60L 53/00 |
| 2023/0012850 A1* | 1/2023 | Hoki | B60L 58/12 |
| 2023/0018467 A1* | 1/2023 | Hoki | B60L 53/63 |
| 2023/0053671 A1* | 2/2023 | Gonring | B60L 50/60 |
| 2023/0088976 A1* | 3/2023 | Schimpe | H02J 7/007192 320/109 |

OTHER PUBLICATIONS

EPO machine translation of JP 2017-93187A (original JP document published May 25, 2017) (Year: 2017).*

* cited by examiner

METHOD AND SYSTEM FOR AN ELECTRIFIED VEHICLE

INTRODUCTION

Electrified vehicles may operate in geographic locations that may be subjected to natural or man-made flooding events, such as may be due to hurricanes, rivers overflowing levees, seawall levee faults, etc. Such flooding may lead to partial or total immersion of one or multiple electrified vehicles. A high-voltage rechargeable electrical energy storage device, such as may be employed on an electrified vehicle, may experience thermal runaway propagation when immersed in water, especially in seawater, for an extended period of time.

SUMMARY

The concepts described herein relate to methods, systems, and analytical techniques to mitigate potential effects of partial or total immersion of a high-voltage rechargeable electrical energy storage device that is arranged on an electrified vehicle. The concepts described herein also relate to methods, systems, and analytical techniques to mitigate potential effects of partial or total immersion of a low-voltage rechargeable electrical energy storage device that is arranged on an electrified vehicle.

An aspect of the disclosure may include a system for an electrified vehicle that includes a rechargeable energy storage device (RESS) electrically couplable via an electric power bus to an actuator, a telematics system, and an on-vehicle controller. The on-vehicle controller is operatively connected to the actuator, and in communication with the RESS and the telematics system. The on-vehicle controller includes an instruction set that is executable to: receive, via the telematics system, a notification of a proximal impending catastrophic event; determine an intent to safeguard the electrified vehicle; execute a high-voltage discharge protocol in response to the intent to safeguard the electrified vehicle, wherein the high-voltage discharge protocol includes operating the actuator; monitor a state of charge (SOC) of the RESS; and electrically decouple the RESS from the electric power bus when the SOC of the RESS is less than a first threshold SOC.

Another aspect of the disclosure may include the RESS being electrically couplable to the electric power bus via a plurality of electrical contactors; wherein the instruction set is executable to open the electrical contactors to electrically decouple the RESS from the electric power bus when the SOC of the RESS is less than the first threshold SOC.

Another aspect of the disclosure may include a low-voltage electrical energy storage device operatively connected to a low-voltage actuator; wherein the instruction set is further executable to execute a low-voltage discharge protocol, wherein the low-voltage discharge protocol includes operating the low-voltage actuator to discharge the low-voltage electrical energy storage device; and disconnect the low-voltage electrical energy storage device when a state of charge of the low-voltage electrical energy storage device is less than a second threshold state of charge.

Another aspect of the disclosure may include the instruction set being executable to determine an intent to safeguard the electrified vehicle by communicating with a vehicle owner to confirm the intent to safeguard the electrified vehicle.

Another aspect of the disclosure may include the instruction set being executable to communicate with the vehicle owner via the telematics system.

Another aspect of the disclosure may include the instruction set being executable to communicate with the vehicle owner to confirm the intent to safeguard the electrified vehicle by communicating with the vehicle owner via an on-vehicle display.

Another aspect of the disclosure may include the instruction set having a default intent to safeguard the electrified vehicle absent an express operator command to not safeguard the electrified vehicle.

Another aspect of the disclosure may include the telematics system having a global position sensor, with the instruction set being executable to receive, via the telematics system, the notification of the proximal impending catastrophic event based upon a location of the electrified vehicle derived from the global position sensor.

Another aspect of the disclosure may include the instruction set being executable to execute the high-voltage discharge protocol including operating the HV actuator to discharge the RESS.

Another aspect of the disclosure may include the telematics system communicating with a cloud-based server, and wherein the instruction set is executable to receive, from the cloud-based server via the telematics system, the notification of the proximal impending catastrophic event.

Another aspect of the disclosure may include a system for an electrified vehicle that includes a rechargeable energy storage device (RESS) electrically couplable to a traction motor and to a HV actuator via a high-voltage bus having high-voltage (HV) electrical contactors, a telematics system, and a global position sensor, wherein the telematics system communicates a geographic position of the electrified vehicle to a remote service center; and an on-vehicle controller. The on-vehicle controller is operatively connected to the HV actuator and the HV electrical contactors, and is in communication with the RESS and the telematics system. The on-vehicle controller includes an instruction set that is executable to receive, via the telematics system, a notification of a proximal impending catastrophic event from the remote service center; verify an intent to safeguard the electrified vehicle; execute a high-voltage discharge protocol to discharge the RESS, wherein the high-voltage discharge protocol includes operating the HV actuator to discharge the RESS; monitor a state of charge (SOC) of the RESS; and open the HV electrical contactors when the SOC of the RESS is less than a first threshold SOC.

The above summary is not intended to represent every possible embodiment or every aspect of the present disclosure. The foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the claims.

BRIEF DESCRIPTION OF THE DRAWINGS

One or more embodiments will now be described, by way of example, with reference to the accompanying drawings, in which.

Figure 1:
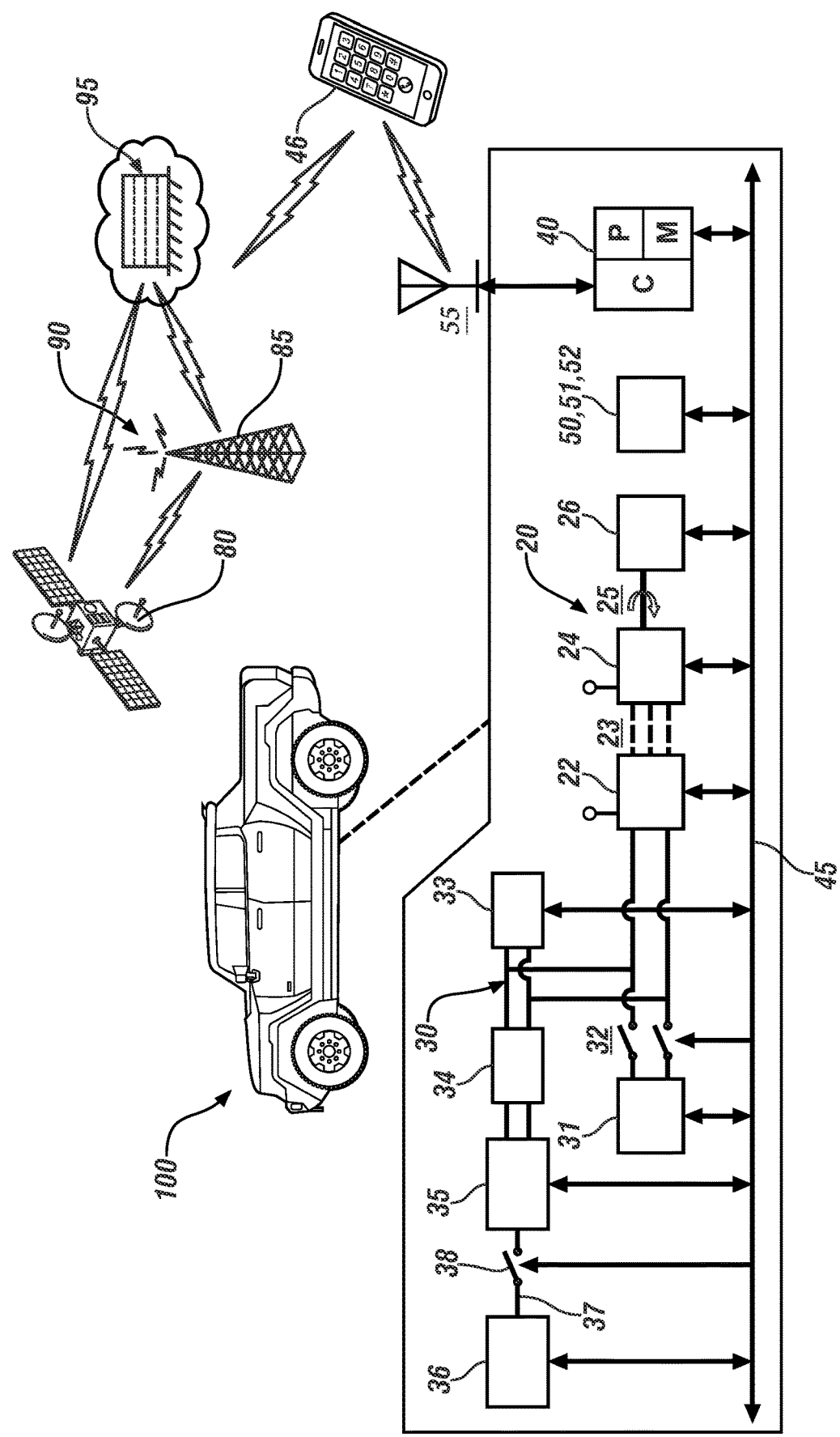
FIG. 1 schematically illustrates a vehicle having an electrified (EV) drivetrain, in accordance with the disclosure.

The appended drawings are not necessarily to scale, and may present a simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail to avoid unnecessarily obscuring the disclosure. For purposes of convenience and clarity, directional terms such as top, bottom, left, right, up, over, above, below, beneath, rear, and front, may be used with respect to the drawings. These and similar directional terms are not to be construed to limit the scope of the disclosure. Furthermore, the disclosure, as illustrated and described herein, may be practiced in the absence of an element that is not specifically disclosed herein.

As used herein, the term "system" may refer to one of or a combination of mechanical and electrical actuators, sensors, controllers, application-specific integrated circuits (ASIC), combinatorial logic circuits, software, firmware, and/or other components that are arranged to provide the described functionality. Exemplary embodiments may be described herein in terms of functional and/or logical block components and various processing steps. Such block components may be realized by a combination or collection of mechanical and electrical hardware, software, and/or firmware components configured to perform the specified functions. For example, an embodiment may employ various combinations of mechanical components and electrical components, integrated circuit components, memory elements, digital signal processing elements, logic elements, look-up tables, or the like, which may carry out a variety of functions under the control of one or more microprocessors or other control devices. In addition, those skilled in the art will appreciate that the exemplary embodiments may be practiced in conjunction with mechanical and/or electronic systems, and that the vehicle systems described herein are merely exemplary embodiment of possible implementations.

The use of ordinals such as first, second and third does not necessarily imply a ranked sense of order, but may distinguish between multiple instances of an act or structure.

Referring to the drawings, wherein like reference numerals correspond to like or similar components throughout the several Figures, FIG. 1 schematically illustrates details related to an electrified vehicle 100 that includes an electrified vehicle (EV) drivetrain 20 coupled to a high-voltage electrical system having a rechargeable energy storage device (RESS) 31. The electrified vehicle 100 also includes an on-vehicle controller 40, a navigation system 50 including a global navigation satellite system (GNSS) sensor 51, and a telematics system 55 that provides extra-vehicle communication. The EV drivetrain 20 is arranged to transfer propulsion torque to one of or a plurality of wheels employing electrified drive units that employ one or multiple electric machines to generate tractive torque. In one embodiment, the EV drivetrain 20 is an electric vehicle drivetrain, wherein all tractive force is generated by electric machine(s) employing electric energy derived from the RESS 31. In one embodiment, the EV drivetrain 20 is a hybrid-electric vehicle drivetrain, wherein a portion of the tractive force and/or a portion of the electric energy is derived from an internal combustion engine, with one or multiple electric machine(s) providing primary or supplemental tractive force. The EV drivetrain 20 may be capable of single-wheel drive operation, two-wheel drive (2WD) operation, four-wheel drive (4WD) operation, all-wheel drive (AWD) operation, and/or another drivetrain operation within the concepts described herein. The electrified vehicle 100 may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure.

The controller C 40 has a processor P and memory M that include instruction sets in the form of algorithmic code to control and manage operations of various onboard systems and components in the electrified vehicle 100.

The RESS 31 is a rechargeable electrochemical energy storage device, e.g., a multi-cell lithium ion battery or a nickel metal hydride battery. In one embodiment, the RESS 31 may be assembled into a containment system.

The RESS 31 electrically connects to a high-voltage DC power bus 30 via electrical contactors 32 that are controllable by the controller 40. The RESS 31 electrically connects to an electric power inverter (PIM) 22 via the electric power bus 30. The RESS 31 transfers DC electric power to the power inverter 22, which is electrically connected to one or multiple rotary electric machine(s) 24 via connectors 23.

The EV drivetrain 20 includes the RESS 31, power inverter 22 and at least one or multiple rotary electric machine(s) 24. The rotary electric machine 24 is mechanically coupled to a propulsion unit 26 via a rotatable member 25. The power inverter 22 converts the DC electric power to AC power that is transferred to the EV drivetrain 20 via the power inverter 22 in either a mechanical power generating mode or an electrical power regenerative mode.

The controller 40 is operatively connected to the power inverter 22 to control transfer of electric power between the rechargeable energy storage unit 31 and a plurality of radially oriented electrically conductive windings of a stator of the rotary electric machine 24. The controller 40 controls the power inverter 22 to sequentially electrically activate electrically conductive windings to exert a rotating magnetic force on a rotor of the rotary electric machine 24 to effect rotation, or to react torque to retard rotation during regenerative operation.

The controller C 40 commands the power inverter 22 to control the rotary electric machine 24 to control bi-directional transfer of energy between the rechargeable energy storage unit 31 and the rotary electric machine 24 in either a motoring mode or a regenerative mode. The rotary electric machine 24 may operate using a three-phase AC current.

In one example, the power inverter 22 is a three-phase three-wire voltage-source inverter. The power inverter 22 is configured with control circuits including power transistors, e.g., integrated gate bipolar transistors (IGBTs) for transforming high-voltage DC electric power to high-voltage AC electric power and transforming high-voltage AC electric power to high-voltage DC electric power. The power inverter 22 may employ pulsewidth-modulating (PWM) control of the IGBTs to convert stored DC electric power originating in the RESS 31 to AC electric power to drive the rotary electric machine 24 to generate torque. Similarly, the power inverter 22 converts mechanical power transferred to the rotary electric machine 24 to DC electric power to generate electric energy that is storable in the RESS 31, including as part of a regenerative braking control strategy. The power inverter 22 receives motor control commands and controls inverter states to provide the motor drive and regenerative braking functionality.

The RESS 31 may also be electrically coupled via the high-voltage DC power bus 30 to a DC/DC electric power converter 34 that converts high-voltage electric power on the high-voltage DC power bus 30 to low-voltage electric power that is transferred to a low-voltage electrical energy storage device (battery) 35. The low-voltage battery 35 electrically connects to one or multiple low-voltage actuators 36 via a low-voltage power bus 37 that includes, in one embodiment, a low-voltage contactor 38 that is operatively connected to and controllable by the controller 40. The DC/DC electric power converter 34 is an element of an auxiliary power system that provides low-voltage electric power to the low-voltage actuators 36 on the vehicle, which may include, by way of non-limiting examples, e.g., lighting, electric windows, HVAC fans, seats, and other devices.

The electrified vehicle 100 has a navigation system 50 that includes a computer-readable storage device or media (memory) that includes global navigation satellite system (GNSS) sensor 51, and a human/machine interface (HMI) device 52 for interacting with and operating the navigation system 50. The HMI device 52 may include audio, visual, and/or haptic communication capabilities, including, e.g., an interactive on-vehicle visual display device. The GNSS sensor 51 generates a set of parameters corresponding to vehicle velocity, geospatial position, and vehicle heading. The GNSS sensor 51 is in communication with the telematics device 55 in one embodiment. Alternatively, the GNSS sensor 51 is integrated into the telematics device 55.

Sensors and other monitoring elements (not shown) may be arranged to monitor electrical parameters (e.g., voltage, current) at various locations, and mechanical parameters (e.g., speed) at various other locations.

The various components of the EV drivetrain 20 may be in communication with the controller C 40 (and each other) via a communication bus 45, which may be a short-range network or a long-range network. Additionally, the various components of the EV drivetrain 20 may include physical wired connections.

The electrified vehicle 100 includes one or multiple high-voltage electrically-powered actuators 33 that may be connected to the high-voltage bus 30, including, e.g., a multiphase electric motor that is an element of an electrical steering system, an air conditioning compressor that is an element of an electrically-powered heating-ventilation-air-conditioning (HVAC) system, etc.

The electrified vehicle 100 includes one or multiple low-voltage electrically-powered low-voltage actuators 36, including, e.g. an electrically-powered stability control system, electrical lighting, etc.

The telematics device 55 includes a wireless telematics communication system capable of extra-vehicle communications, including communicating with a communication network system having wireless and wired communication capabilities. The telematics device 55 is capable of extra-vehicle communications that includes short-range ad hoc vehicle-to-vehicle (V2V) communication and/or vehicle-to-everything (V2x) communication, which may include communication with an infrastructure monitor, e.g., a traffic camera and ad hoc vehicle communication. Alternatively, or in addition, the telematics device 55 has a wireless telematics communication system capable of short-range wireless communication to the handheld device 46, e.g., a cell phone, a satellite phone or another telephonic device. In one embodiment, the handheld device 46 executes the extra-vehicle communication, including communicating with an off-board server 95 via a communication network 90 including a satellite 80, an antenna 85, and/or another communication mode. Alternatively, or in addition, the telematics device 55 executes the extra-vehicle communication directly by communicating with the off-board server 95 via the communication network 90. In one embodiment, the off-board server 95 is cloud-based.

As employed herein, the terms "cloud", "cloud-based", and related terms may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The term "controller" and related terms such as microcontroller, control, control unit, processor, etc. refer to one or various combinations of Application Specific Integrated Circuit(s) (ASIC), Field-Programmable Gate Array(s) (FPGA), electronic circuit(s), central processing unit(s), e.g., microprocessor(s) and associated non-transitory memory component(s) in the form of digital data storage mediums including memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning, buffer circuitry and other components, which can be accessed by and executed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables. Each controller executes control routine(s) to provide desired functions. Routines may be executed at regular intervals, for example every 100 microseconds during ongoing operation. Alternatively, routines may be executed in response to occurrence of a triggering event. Communication between controllers, actuators and/or sensors may be accomplished using a direct wired point-to-point link, a networked communication bus link, a wireless link, or another communication link. Communication includes exchanging data signals, including, for example, electrical signals via a conductive medium; electromagnetic signals via air; optical signals via optical waveguides; etc. The data signals may include discrete, analog and/or digitized analog signals representing inputs from sensors, actuator commands, and communication between controllers.

The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium.

The term 'model' refers to a processor-based or processor-executable code and associated calibration that simulates a physical existence of a device or a physical process.

As used herein, the terms 'dynamic', 'dynamically' and related terms describe steps or processes that are executed in real-time and are characterized by monitoring or otherwise determining states of parameters and regularly or periodically updating the states of the parameters during execution of a routine or between iterations of execution of the routine.

The terms "calibration", "calibrated", and related terms refer to a result or a process that correlates a desired parameter and one or multiple perceived or observed parameters for a device or a system. A calibration as described herein may be reduced to a storable parametric table, a plurality of executable equations or another suitable form that may be employed as part of a measurement or control routine.

A parameter is defined as a measurable quantity that represents a physical property of a device or other element that is discernible using one or more sensors and/or a physical model. A parameter can have a discrete value, e.g., either "1" or "0", or can be infinitely variable in value.

Figure 2:
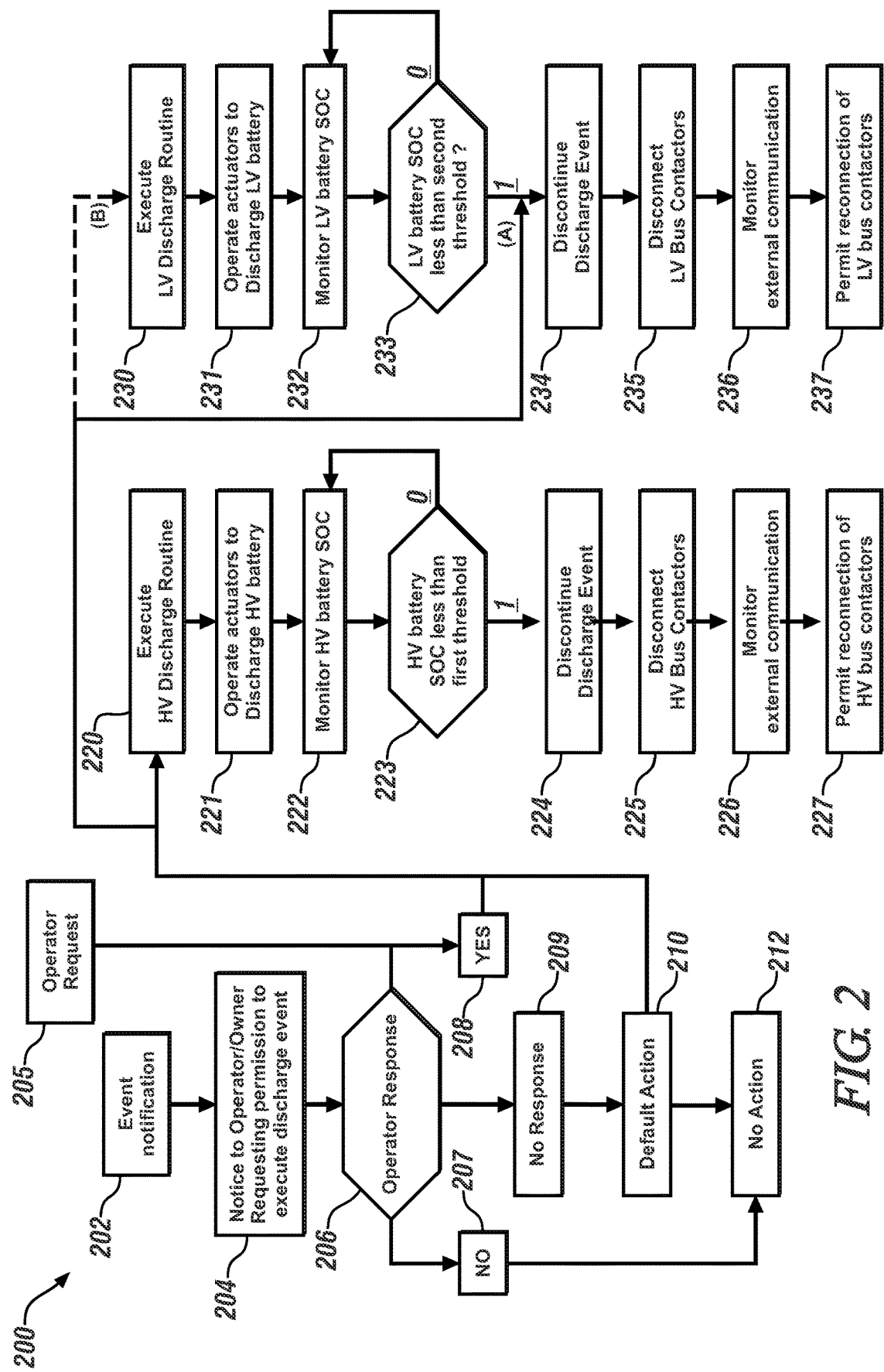
FIG. 2 schematically illustrates an embodiment of an auto-discharge control routine that is executable by the vehicle described with reference to FIG. 1, in accordance with the disclosure.

FIG. 2 schematically illustrates, in flowchart form, elements of an embodiment of the auto-discharge control routine 200, which may be implemented as one or multiple algorithms that are executable on an embodiment of the electrified vehicle 100 described with reference to FIG. 1. The auto-discharge control routine 200 operates to safeguard the electrified vehicle 100 in response to notification of an impending or imminent risk of occurrence of a natural or other event proximal to or in the vicinity of the geographic location of the electrified vehicle 100, wherein such natural or other event may result in the electrified vehicle 100 being at least partially engulfed by or submerged in water or another substance. The overall operation of the auto-discharge control routine 200 includes undertaking actions to discharge the RESS 31 and/or the low-voltage battery 35 to low levels, and, in one embodiment, electrically isolating the RESS 31 and/or the low-voltage battery 35. Details of embodiments of the auto-discharge control routine 200 are now described.

Referring again to FIG. 2, an off-board system, e.g., the off-board server 95 receives notification of an impending or imminent risk of occurrence of a natural or other event proximal to or in the vicinity of the geographic location of the electrified vehicle 100 as indicated by the GNSS 51, wherein such natural or other event may result in the electrified vehicle 100 being at least partially engulfed in water or another substance (Step 202). The notification may be generated as part of or in response to an official communication protocol that includes an emergency broadcast.

In response, the off-board server 95 communicates, via the communication network 90, a notification message to a vehicle owner and/or vehicle operator, wherein the notification message requests permission of the vehicle owner and/or vehicle operator to execute the auto-discharge control routine 200 (Step 204). The notification message may be in the form of one or more of a text message, an email message, a social media message, etc., that may be communicated to the vehicle owner or operator via a personal communication device such as a cellular phone, a tablet, a laptop computer, a desk computer, etc. The notification message may also be communicated to the on-vehicle communication system via the telematics device 55. The notification message may include a request for a response within a predetermined time period, and notification of a default action if no response is received within the predetermined time period.

The auto-discharge control routine 200 begins execution after the off-board server sends the notification message to the vehicle owner and/or operator requesting permission of the vehicle owner and/or vehicle operator to execute the auto-discharge control routine 200 (Step 204).

Initially, the auto-discharge control routine 200 awaits a response from the operator (Step 206). The response may be in the form of NO (Step 207), YES (Step 208), or there may no response from the operator (Step 209).

When the response is NO (Step 207), the auto-discharge control routine 200 undertakes no further action (Step 212). The response being NO (Step 207) may be an indication that the owner and/or operator intends to transport the electrified vehicle 100 away from the impending event, thus precluding a need for the auto-discharge control routine 200.

When the response is no response (Step 209), the auto-discharge control routine 200 queries the on-vehicle control system to determine presence of a default action (Step 210) and acts in accordance with the default action. The default action may be in the form of the response being NO, and as such, the auto-discharge control routine 200 undertakes no further action (Step 212). The auto-discharge control routine 200 may repeatedly query the vehicle owner and/or operator to verify implementation of the default action when the default action is NO. The default action may be in the form of the response being YES (Step 208).

Alternatively, the operator may request execution of the auto-discharge control routine 200 (Step 205). The operator may request execution of the auto-discharge control routine 200 for various reasons, including, e.g., prior to placement of the vehicle into long-term storage, etc.

When the operator response is YES (Step 208), or the default action indicates YES (Step 210), or the operator requests execution of the auto-discharge control routine 200 (Step 205), the auto-discharge control routine 200 begins execution of a high-voltage system discharge routine (Steps 220-227), and in some embodiments, execution of a low-voltage system discharge routine (Steps 230-237).

The high-voltage system discharge routine (Step 220) includes discharging electrical power stored in the RESS 31 by operating one or more of the high-voltage actuators 33 (Step 221) and monitoring a state of charge (SOC) of the RESS 31 (Step 222). This may include, by way of non-limiting examples, operating the multiphase electric motor of the electrical steering system, a coolant circulation pump, the multiphase motor that is an element of the air conditioning compressor, etc.

The SOC of the RESS 31 is regularly and periodically monitored and compared to a first threshold SOC (Step 223). Operation continues when the SOC of the RESS 31 is greater than or equal to the first threshold SOC (Step 223)(0). When the SOC of the RESS 31 is less than the first threshold SOC (Step 223)(1), the discharging event is discontinued (Step 224), and the controller 40 commands the electrical contactors 32 to an open state (Step 225), thus electrically disconnecting the RESS 31 from the high-voltage electrical bus 30. The first threshold SOC is a calibratable value that is application-specific, and is determined during vehicle development and calibration. In one embodiment, the first threshold SOC is 20%.

The controller 40 may continue to monitor external communications via the telematics device 55 (Step 226), and permits reconnecting the RESS 31 to the high-voltage electrical bus 30 (Step 227), such as after the impending or imminent risk of occurrence of a natural or other event proximal to or in the vicinity of the geographic location of the electrified vehicle 100 has passed. The controller 40 permits reconnecting the RESS 31 to the high-voltage electrical bus 30 at some time in the future by commanding the electrical contactors 32 to a closed state. This may occur in response to a notification that the risk from the impending event has abated, passed, or otherwise been averted.

The low-voltage system discharge routine may include path (A), which is composed of Steps 234-237. Alternatively, the low-voltage system discharge routine may include path (B), which is composed of Steps 230-237.

The low-voltage system discharge routine (Step 230) includes discharging electrical power stored in the low-voltage battery 35 by operating one or more of the low-voltage actuators 36 (Step 231) and monitoring a state of charge (SOC) of the low-voltage battery 35 (Step 232). The low-voltage actuators 36 may include, by way of non-limiting examples, the electrical lighting devices, fans, heating devices, etc.

The SOC of the low-voltage battery 35 is regularly and periodically monitored and compared to a second threshold SOC (Step 233). Operation continues when the SOC of the low-voltage battery 35 is greater than or equal to the second threshold SOC (Step 233)(0). When the SOC of the low-voltage battery 35 is less than the second threshold SOC (Step 233)(1), the discharging event is discontinued (Step 234), and the controller 40 commands the electrical contactors 38 to an open state (Step 235), thus electrically disconnecting the low-voltage battery 35 from the low-voltage electrical bus 37. The second threshold SOC is a calibratable value that is application-specific, and is determined during vehicle development and calibration.

When the low-voltage system discharge routine includes only path (A), composed of Steps 234-237, the controller 40 commands the electrical contactors 38 to an open state (Step 235), thus electrically disconnecting the low-voltage battery 35 from the low-voltage electrical bus 37 without discharging the low-voltage battery 35.

The controller 40 may continue to monitor external communications via the telematics device 55 (Step 236), and permits reconnecting the low-voltage battery 35 to the low-voltage electrical bus 37 (Step 237), such as after the impending or imminent risk of occurrence of a natural or other event proximal to or in the vicinity of the geographic location of the electrified vehicle 100 has passed. The controller 40 permits reconnecting the low-voltage battery 35 to the low-voltage electrical bus 37 at some time in the future by commanding the electrical contactors 38 to a closed state. This may occur in response to a notification that the risk from the impending event has abated, passed, or otherwise been averted.

The auto-discharge control routine 200 is intended to reduce likelihood of thermal runaway propagation in the RESS 31 in the event that the RESS 31 is partially or totally submerged in water for an extended period of time.

The auto-discharge control routine 200 is further intended to reduce likelihood of thermal runaway propagation in the low-voltage battery 35 and connected circuits and actuators in the event that it is partially or totally submerged in water for an extended period of time.

In this manner, the vehicle controller 40 may receive, via the telematics system 55, a notification from the off-board server 95 of a proximal impending catastrophic event. The controller 40 verifies, confirms, authenticates or otherwise determines an intent to safeguard the electrified vehicle by communicating with the vehicle owner and/or operator, or via a default strategy, and executes a high-voltage discharge protocol in response to the intent to safeguard the electrified vehicle. The high-voltage discharge protocol includes operating the actuator, monitoring a state of charge (SOC) of the RESS, and electrically decoupling the RESS from the electric power bus when the SOC of the RESS is less than a first threshold SOC.

The controller 40 is further able to open the electrical contactors 32 to electrically decouple the RESS 31 from the high-voltage electric power bus 30 when the SOC of the RESS 31 is less than the first threshold SOC.

The controller 40 is further able execute a low-voltage discharge protocol, wherein the low-voltage discharge protocol includes operating the low-voltage actuator(s) 36 to discharge the low-voltage battery 35, and disconnect the low-voltage battery 35 when a state of charge of the low-voltage battery 35 is less than a second threshold state of charge.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which includes one or more executable instructions for implementing the specified logical function(s). It will also be noted that each block of the block diagrams and/or flowchart illustrations, and combinations of blocks in the block diagrams and/or flowchart illustrations, may be implemented by dedicated-function hardware-based systems that perform the specified functions or acts, or combinations of dedicated-function hardware and computer instructions. These computer program instructions may also be stored in a computer-readable medium that can direct a computer or other programmable data processing apparatus to function in a particular manner, such that the instructions stored in the computer-readable medium produce an article of manufacture including an instruction set that implements the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the claims.

What is claimed is:

1. A system for an electrified vehicle, comprising:
   a rechargeable energy storage device (RESS) electrically couplable via an electric power bus to a high-voltage (HV) actuator;
   a telematics system;
   a low-voltage electrical energy storage device operatively connected to a low-voltage actuator; and an on-vehicle controller, the on-vehicle controller operatively connected to the HV actuator, the low-voltage actuator, and in communication with the RESS and the telematics system;

the on-vehicle controller including an instruction set, the instruction set being executable to:

receive, via the telematics system, a notification of an event, wherein the notification is an official communication protocol that includes an emergency broadcast, determine, via one of the telematics system or the on-vehicle controller, an intent to safeguard the electrified vehicle, execute a high-voltage system discharge routine in response to the intent to safeguard the electrified vehicle, wherein the high-voltage system discharge routine includes operating the HV actuator to discharge the RESS, monitor a state of charge (SOC) of the RESS, electrically decouple the RESS from the electric power bus when the SOC of the RESS is less than a first threshold SOC, execute a low-voltage system discharge routine, wherein the voltage system discharge routine includes operating the low-voltage actuator to discharge the low-voltage electrical energy storage device, and disconnect the low-voltage electrical energy storage device from the low-voltage actuator when a state of charge of the low-voltage electrical energy storage device is less than a second threshold state of charge.

2. The system of claim 1, further comprising the RESS being electrically couplable to the electric power bus via a plurality of electrical contactors; wherein the instruction set is executable to open the electrical contactors to electrically decouple the RESS from the electric power bus when the SOC of the RESS is less than the first threshold SOC.

3. The system of claim 1, wherein the instruction set being executable to determine, via one of the telematics system or the on-vehicle controller, the intent to safeguard the electrified vehicle comprises the instruction set being executable to communicate via the telematics system with a vehicle owner to confirm the intent to safeguard the electrified vehicle.

4. The system of claim 3, wherein the instruction set being executable to communicate with the vehicle owner to confirm the intent to safeguard the electrified vehicle further comprises the instruction set being executable to communicate with the vehicle owner via an on-vehicle display.

5. The system of claim 1, wherein the instruction set being executable to determine, via one of the telematics system or the on-vehicle controller, an intent to safeguard the electrified vehicle comprises the instruction set having a default intent that is executable by the on-vehicle controller to safeguard the electrified vehicle absent an express operator command to not safeguard the electrified vehicle.

6. The system of claim 1, wherein the telematics system includes a global position sensor; and wherein the instruction set is executable to receive, via the telematics system, the notification of the event based upon a location of the electrified vehicle derived from the global position sensor.

7. The system of claim 1, wherein the instruction set being executable to execute the high-voltage system discharge routine in response to the intent to safeguard the electrified vehicle comprises the instruction set being executable to execute the high-voltage system discharge routine including operating the HV actuator to discharge the RESS.

8. The system of claim 1, wherein the telematics system communicates with a cloud-based server, and wherein the instruction set is executable to receive, from the cloud-based server via the telematics system, the notification of the event.

9. The system of claim 1, wherein the HV actuator comprises a multiphase electric motor of one of an electrical steering system or air conditioning compressor.

10. The system of claim 1, wherein the low-voltage actuator comprises one of an electrical lighting device, a fan, or a heating device.

11. A system for an electrified vehicle, the system comprising:

a rechargeable energy storage device (RESS) electrically couplable to a traction motor and to a high-voltage (HV) actuator via a high-voltage bus having HV electrical contactors;

a telematics system and a global position sensor, wherein the telematics system communicates a geographic position of the electrified vehicle to a remote service center;

a low-voltage electrical energy storage device operatively connected to a low-voltage actuator; and an on-vehicle controller, the on-vehicle controller operatively connected to the HV actuator and the HV electrical contactors, the low-voltage actuator, and in communication with the RESS and the telematics system;

the on-vehicle controller including an instruction set, the instruction set being executable to receive a request to safeguard the electrified vehicle;

execute a high-voltage system discharge routine to discharge the RESS, wherein the high-voltage system discharge routine includes operating the HV actuator to discharge the RESS, monitor a state of charge (SOC) of the RESS, open the HV electrical contactors when the SOC of the RESS is less than a first threshold SOC, execute a low-voltage system discharge routine, wherein the voltage system discharge routine includes operating the low-voltage actuator to discharge the low-voltage electrical energy storage device, and disconnect the low-voltage electrical energy storage device from the low-voltage actuator when a state of charge of the low-voltage electrical energy storage device is less than a second threshold state of charge.

12. The system of claim 11, wherein the instruction set being executable to receive the request to safeguard the electrified vehicle comprises the instruction set being executable to receive an operator request to safeguard the electrified vehicle.

13. The system of claim 11, wherein the instruction set being executable to receive the request to safeguard the electrified vehicle comprises the instruction set being executable to receive, via the telematics system, a notification of an event from the remote service center; and verify an intent to safeguard the electrified vehicle.

14. The system of claim 13, wherein the instruction set being executable to verify an intent to safeguard the electrified vehicle comprises the instruction set being executable to communicate with a vehicle owner via the telematics system to confirm the intent to safeguard the electrified vehicle.

15. The system of claim 14, wherein the instruction set being executable to communicate with the vehicle owner to confirm the intent to safeguard the electrified vehicle comprises the instruction set being executable to communicate with the vehicle owner via an on-vehicle display.

16. The system of claim 13, wherein the instruction set is executable to receive, via the telematics system, the notification of the event based upon a location of the electrified vehicle derived from the global position sensor.

17. The system of claim 13, wherein the remote service center comprises a cloud-based server, and wherein the instruction set is executable to receive, from the cloud-based server via the telematics system, the notification of the event.

18. The system of claim 11, wherein the HV actuator comprises a multiphase electric motor of one of an electrical steering system or air conditioning compressor.

19. The system of claim 11, wherein the low-voltage actuator comprises one of an electrical lighting device, a fan, or a heating device.

20. A method for operating an electrified vehicle including a rechargeable energy storage device (RESS) electrically couplable to a traction motor and to a first actuator via a high-voltage electric power bus, the method comprising:
   receiving, via a telematics system, a notification of an event from a remote service center;
   verifying an intent to safeguard the electrified vehicle;
   executing, via an on-vehicle controller, a high-voltage discharge protocol to discharge the RESS, wherein the high-voltage discharge protocol includes operating the first actuator to discharge the RESS;
   monitoring, via the on-vehicle controller, a state of charge (SOC) of the RESS;
   opening high-voltage electrical contactors to electrically decouple the RESS from the high-voltage electric power bus when the SOC of the RESS is less than a first threshold SOC;
   executing a low-voltage system discharge routine, wherein the low-voltage system discharge routine includes operating a second actuator to discharge a low-voltage electrical energy storage device; and
   disconnecting the low-voltage electrical energy storage device from the second actuator when a state of charge of the low-voltage electrical energy storage device is less than a second threshold state of charge.

* * * * *